Patented May 30, 1939

2,160,232

UNITED STATES PATENT OFFICE 2,160,232

HEAT-TREATED MONOCALCIUM PHOSPHATE

Julian R. Schlaeger, Chicago Heights, Ill., assignor to Victor Chemical Works, a corporation of Illinois No Drawing. Application August 22, 1938, Serial No. 226,174

19 Claims. (Cl. 23—108)

This invention relates to an improved baking acid and more particularly to an anhydrous monocalcium phosphate baking acid having a slow rate of reaction in dough mixtures.

The baking characteristics of ordinary monocalcium phosphate monohydrate are well known, and the material has been used extensively in commercial baking powders, self-rising flour, and in ready mixed cake, waffle and doughnut flours. The material has one serious disadvantage in that its primary rate of reaction with the sodium bicarbonate commonly employed in dough mixtures is too high for the most efficient utilization of its theoretical leavening power. Correspondingly the rate of reaction in the secondary period is low. Heretofore attempts to slow down its primary rate of reaction have been ineffective.

The term primary reaction rate means the amount of $CO_2$ generated in the first two minutes by reaction of the material in a water medium with sodium bicarbonate at 27° C. with a standard quantity of bicarbonate capable of liberating 200 c.c. of $CO_2$. The secondary reaction rate is the amount of $CO_2$ generated in the succeeding 8 minutes. In some cases the rates are measured on dough mixes instead of water, and in such cases the primary period is two minutes, but the secondary period is 13 minutes instead of 8. In the present description the water rate is referred to in all the specific examples unless the dough mix is specifically referred to. The percentage evolved in either period may be obtained by dividing the rate by two.

Sodium acid pyrophosphate has been employed as a baking acid and, while it reacts more slowly, leaves a slightly bitter, astringent taste in the baked product, which is known as "pyro flavor". This flavor is seriously objected to by many bakers. On this account any attempt to retard the rate of reaction of monocalcium phosphate should avoid the production of pyrophosphate in an amount sufficient to produce this "pyro flavor".

In accordance with this invention a monocalcium phosphate having a markedly lessened primary reaction rate and an increased secondary reaction rate is produced without the production of pyrophosphate in sufficient quantities to produce "pyro flavor".

In accordance with the preferred form of this invention, anhydrous solid crystalline monocalcium phosphate is heated under carefully controlled conditions to produce what appears as a thin skin coating, which is very slowly penetrated by water and which protects the interior of the particle during the initial stages of the preparation of the dough.

Grinding of the material after heat treatment restores substantially the original rate of reaction presumably by destroying the covering effect of the coating. It is, therefore, important that the starting material have the necessary fineness of division desirable in a baking acid.

Similar results may be accomplished by heating porous anhydrous monocalcium phosphate to improve that product, but the resultant material is less altered in its rate of reaction than that produced by heating the solid non-porous material and does not retain its altered reaction rate so well upon standing in a moist atmosphere.

The heat treatment comprises subjecting the anhydrous monocalcium phosphate particle to a temperature above 140° C. for a period of time sufficient to decrease its initial reaction rate with sodium bicarbonate at least 10% and preferably at least 35–45% and to increase its secondary reaction rate correspondingly. This should be carried out without converting any appreciable amount of the orthophosphate to pyrophosphate. The exact chemical changes taking place are not fully understood. It is possible that a thin skin of insoluble metaphosphate is formed on the surface of the product. Photomicrographs indicate clearly the formation of a shell upon solution of the soluble phosphate in which segregated particles of dicalcium phosphate are held.

Whatever the chemical changes may be, physically a thin, transparent, fused or glass-like skin appears around the particle, which is relatively insoluble as compared to the interior. When the product is employed in a baking preparation, this skin delays the reaction with the sodium bicarbonate of the baking preparation and permits the preparation of wet dough and batter mixes without large losses of the leavening gases. As a result, a larger proportion of gas is liberated in the early baking stage in the oven.

The preferred anhydrous monocalcium phosphate is prepared as described in the copending application of William H. Knox, Jr., Ser. No. 226,180, filed August 22, 1938. A typical example of that procedure is as follows:

A quantity of 57.5 Baumé gravity strength blast furnace phosphoric acid was heated to approximately 110° C., placed in a batch mixer equipped with an efficient agitator, and quicklime equivalent to about 70 to 80% of that theoretically required to produce monocalcium phosphate was added as rapidly as possible without permitting the reaction temperature to rise above 170° C. The lime had previously been ground to at least 100 mesh in order to increase the rapidity of the reaction as well as the distribution thereof. As the temperature began to drop below 165° C., due to the evolution of steam, small additions of hydrated lime were made, causing the temperature again to rise. As the temperature approached 170° C., water in small amounts was sprayed into the mixture, but the temperature was not permitted to fall below 160° C. The reaction temperature was thus maintained until sufficient hydrated lime had been added to obtain a product which was definitely neutral to methyl orange. Approximately 2.5% excess lime over that theoretically required was used in the batch. Under the conditions outlined, the batch temperature was maintained between 170° C. and 160° C. for 25 minutes.

This material is then passed through a screen, the openings of which are at least as small as 100 mesh and preferably of 200 mesh size. The product will generally have a neutralizing value of about 84 to 93, and preferably 87 to 91, in terms of parts by weight of sodium bicarbonate completely neutralized by 100 parts by weight of the acid phosphate. The material is an effective baking acid without further treatment and is claimed as such in the copending application of William H. Knox, Jr., Serial No. 226,180, filed August 22, 1938. The neutralizing value of the product falls approximately 3 to 4 points on heat treatment, so that with a range of 87-91 originally the heat treated material will be from about 83-88.

The baking characteristics of this product, however, are greatly improved by further heat treatment, which is effected by heating the particles to a temperature above 140° C. and below a temperature at which substantial quantities of pyrophosphate are formed. This treatment may be made by passing the material through a rotary kiln, a shelf drier, or even by dropping the material through a flame or heated chamber. The higher the temperature employed, the shorter will be the time required to effect the formation of the skin-like coating over the particles. Where flame temperatures are employed the time of contact is not sufficient for a thorough heating of the particle.

Temperatures of the material about 230° C. tend to cause rapid conversion of the orthophosphate to pyrophosphate and should be avoided.

Temperatures between 190° C. and 230° C. likewise tend to cause the formation of pyrophosphate unless precautions are taken, particularly with respect to the amount of moisture present and the degree of neutrality.

Where the starting materials are completely anhydrous at the beginning of the operation (i. e. do not become anhydrous during the operation), it is preferred to employ a heat treating temperature of 200° C. to 220° C. The lower temperatures produce a heat treating effect but require relatively long periods of exposure. For example, at 140° C., from 5 to 20 hours are necessary, depending upon the degree of improvement desired.

For best results the heat treatment is normally carried forward to a point just under that at which substantial amounts of pyrophosphate begin to form. The production of more than 10% of pyrophosphate in the material produces a "pyro taste" in the product. However, the presence of smaller amounts of pyrophosphate has a decided effect upon the stability of the product under relatively humid conditions. For example, a product having a neutralizing value of 81.0 and containing 3.4% pyrophosphate had a secondary reaction rate of 117 c. c., which dropped to 45 c. c. after 21 days in an atmosphere of 65% relative humidity at 39° C. On the other hand, a similar product having a neutralizing value of 81.2 with a 2.5% pyrophosphate had a secondary reaction rate of 119 c. c. when made and this had dropped only to 72 c. c. after 21 days under the same storage conditions. While both of these products have considerable commercial value, the second is obviously much superior. It is therefore preferred, from the standpoint of stability in a moist atmosphere, to keep the pyrophosphate below 5% and preferably below 3%.

In the heat treatment it is preferred to approach the maximum temperature gradually, particularly at temperatures about 180° C. It is possible that this procedure insures the removal of all traces of moisture before a pyrophosphate-forming temperature is reached.

In heat treating a hydrated monocalcium phosphate the temperature is maintained at 100° C. to 180° C. until all crystal water has been removed and the product then heated at 180° C. to 220° C. until the desired improvement has occurred.

With a properly prepared starting material of the Knox type, the temperature and time may be varied over a considerable range without greatly affecting the character of the product. Good results have been obtained by heating such material for one hour at 225° C. or several hours at 220° C. In preferred practice, the material is passed through a rotary converter countercurrent to a flow of heated air at such rate that the material discharges at a temperature of 210-220° C. Under the conditions used, the material is in the converter for about 2½ hours and is at a temperature above 200° C. for approximately 30 minutes.

While baking acids are customarily stored in sealed containers, they are frequently left in an imperfectly sealed condition on shelves for long periods. For greatest commercial value, therefore, maximum stability against rehydration is desirable in an anhydrous product such as that herein described.

In order that the heat treated product have such greatest possible stability toward moisture on storage, considerable care should be observed in selecting it. The heat treatment may be applied to any anhydrous monocalcium phosphate, whether solid or porous, and whether crystallized in a substantially pure form, or whether made anhydrous by dehydration of hydrated monocalcium phosphate. Materials other than the solid, non-porous crystalline material prepared by the Knox process are relatively unstable, however. For example, an anhydrous material prepared by crystallization in a substantially pure state from strong phosphoric acid solution after heat treatment had a secondary reaction rate of 83 c. c. in a dough mixtue, which dropped to 26 c. c. after 5 days' storage at 35° C. and 65% relative humidity.

Heat treatment of anhydrous material prepared by first heating monohydrated monocalcium phosphate to drive off the water of crystallization produces different results both in the amount by which the reaction rate may be altered and in the stability of the product in the presence of water vapor. These differences are due to such factors as physical condition of the material, the batch conditions under which it was made, the degree of neutrality, and the presence of impurities. A high amount of free acid appears to be undesirable.

These factors also have a bearing upon the stability of the preferred anhydrous material, and the method of its preparation has a decided effect upon the heat-treated material.

The conditions under which the reaction for producing the anhydrous material is carried out should be, therefore, for maximum stability, very carefully controlled. In this connection, the reaction temperature should at all times be in excess of 140° C. to avoid formation of hydrated material, and the temperature should be controlled and produced by the heat of reaction of the materials. The phosphoric acid used is preferably heated in advance and its concentration is made great enough that the reaction will generate sufficient heat to elevate the temperature of the materials as well as the water in the phosphoric acid solution to the requisite temperature.

Under normal conditions this requires a phosphoric acid having a Baumé gravity strength in excess of 54°. With phosphoric acids near this border line, it is preferable to use only quicklime as the other reagent, but with acids of higher strength the lime may be partially or entirely hydrated. In any event, the amount of water present, either with the phosphoric acid or with the lime, is made low enough not to reduce the reaction temperature below 140° C. It is preferred not to use an acid having Baumé gravity strength above 65°, because of the mechanical difficulties in securing rapid and intimate mixing in the reaction in such case.

It is preferred that in preparing the anhydrous monocalcium phosphate the total water present at the beginning of the reaction, including that produced by the reaction, be not less than 15% and not more than 32% based on the total CaO and $H_3PO_4$ and that the elimination of this water from the reaction mass be accomplished under such conditions that a dry product results without any substantial formation of a hydrated monocalcium phosphate.

In the preferred preparation process, the temperature of the reaction is carried considerably above 140° C., best results having been obtained in the range from 160° C. to 170° C. or sometimes 175° C. Where the upper limit is employed, greater care must be exercised to avoid the formation of pyrophosphate. The presence of any considerable amount of pyrophosphate distinctly lessens the value of the product, both by lessening its stability and by affecting its ability to be heat-treated under the present process. The process should, therefore, not be operated above 175° C. for any extended period of time.

When the process is operated at a reaction temperature of 160° C. to 170° C. it is preferred to correlate the strength of the acid, the degree of hydration of the lime, and the original temperature of the reacting ingredients, so that they are capable of raising the temperature above 170° C. Then by rapid mixture of lime and acid, the temperature is brought quickly to at least 160° C. and is maintained within the range during subsequent additions of lime by the use of a volatile liquid, such as water, as a cooling agent. This is accomplished by spraying small quantities of water from time to time directly into the reacting mass, the latent heat of the water and the dispersion of it serving to prevent any local overheating which would not be prevented by indirect cooling. Particularly where water is the material sprayed, it is preferable not to add it after the last addition of lime.

The amount of lime employed should be such as to produce a neutralizing value in the final product below 95 and generally above 80, the amount preferably being such as to have a neutralizing value in the range of 84 to 93, and preferably 87 to 91, the product of this range having greater stability, other conditions being equal, against rehydration.

It is also preferred that the reaction in the higher temperature range be carried out as rapidly as possible, inasmuch as the formation of pyrophosphate, or the tendency to form pyrophosphate is greatly increased by the increase of the time of reaction. When proceeding in the manner above set forth, by which the reaction temperature is rapidly raised to 160° C., the reaction may be completed in 20 to 25 minutes. It is preferred that it should be less than 30 minutes. Naturally, longer times are necessary in the lower ranges of the temperature, and at 140° C. the time of reaction is considerably longer.

The acid employed may be any reasonably pure acid, but it is preferred that the acid be blast furnace acid or have the impurities characteristic of such blast furnace acid. The inclusion of these impurities in the product of this invention is valuable in fitting it for heat treatment in accordance with the present process.

In another example, where the batch temperature was maintained between 150° C. and 160° C. for 25 minutes, the product, after heat treatment in accordance with the present process, had an initial two to ten minute baking powder rate of 119 c. c. which, after 21 days at a temperature of 39° C. and a humidity of 65%, had decreased to 72 c. c.

As stated before, it is preferred to add a slight excess of lime. The neutralizing value of pure anhydrous monocalcium phosphate is 95.7, this term meaning the parts by weight of sodium bicarbonate, which will be utilized by 100 parts by weight of the acid phosphate according to the following type reaction:

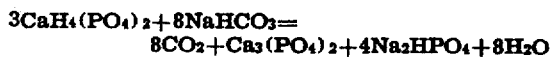

$$3CaH_4(PO_4)_2 + 8NaHCO_3 = \\ 8CO_2 + Ca_3(PO_4)_2 + 4Na_2HPO_4 + 8H_2O$$

The excess of lime here added eliminates any free acid from the product. Some of the excess lime appears in the final product as dicalcium phosphate, which appears to be concentrated in spots on the surfaces of the crystals. A small amount of free lime may be present in the product without materially affecting the baking characteristics.

The method used for testing neutralizing values is that published by the American Association of Cereal Chemists as method 5b on page 117 of Cereal Laboratory Methods, 3rd edition, 1935.

The stability of the product under storage in a moist atmosphere is considerably affected by the presence of impurities. Pure material does not retain its activity well in a damp place. The precise inter-relation of the impurities, however, has not been determined. Impurities which are characteristic of blast furnace phosphoric acid and ordinary high grade lime appear to produce substantially the best results.

The protective coating or medium appear to include an insoluble alkali metal metaphosphate, possibly in combination with some calcium compound. Analysis of the residue of heat treated materials remaining after solution of the remainder in water showed conversion of very considerable amounts of alkali metal material from soluble to insoluble form during heat treatment.

The effect of these impurities is particularly noticeable in connection with the solid, non-porous, crystalline type of product made by the Knox process. For example, a product crystallized from a strong pure phosphoric acid solution, after heat treatment, completely hydrated in less than 48 hours at 39° C. in an atmosphere of 65% relative humidity. On the other hand, a heat treated product made with blast furnace acid containing its normal impurities showed an original secondary reaction rate of 123 c. c. and even after 10 days storage in a humidor at 39° C. and 65% relative humidity, still showed a secondary rate of 100 c..c. At the end of 21 days under the said conditions the secondary rate was still 93 c. c. This product showed the following impurities:

| | Per cent |
|---|---|
| Acid insoluble | 0.09 |
| FePO$_4$ | 0.15 |
| AlPO$_4$ | 0.26 |
| MgO | 0.19 |
| SO$_3$ | 0.21 |
| K$_2$O | 0.38 |
| Na$_2$O | 0.17 |

The addition of impurities to pure phosphoric acid sufficient to give this final composition in the anhydrous monocalcium phosphate will make it as suitable as the blast furnace acid itself.

Of the impurities noted, not all seem to be requisite in producing the improved result, the alkali metals being the most effective.

The function of the impurities is not chemically understood but it appears that during the batch crystallization the impurities concentrate on the surface of the minute crystals and then on heat treatment are converted to insoluble phosphates, possibly fused or partially fused, which form a skin coating over the monocalcium phosphate. It is possible that the alkali metals serve merely as fluxing agents which lower the melting point of this coating. However, investigation has indicated that the percentage of insoluble iron and aluminum compounds does not alter substantially upon heat treatment, whereas the amount of insoluble potassium and sodium compounds increases enormously. For example, in one instance, an untreated sample showed only 0.01% K$_2$O insoluble, but after heat treatment showed 0.17%. In the same sample the Na$_2$O insoluble before heat treatment was 0.017%, which increased to 0.078% on heat treatment.

At the same time there are indications that a small amount of the calcium is converted to insoluble phosphate.

The following tables indicate the effect of the addition of various impurities. Table I shows five batches of heat-treated anhydrous monocalcium phosphate, the first batch being made from substantially pure acid and the remainder made from pure acid to which the indicated impurities had been added. It will be noted that MgO appears in all cases due to its presence in the lime employed:

Table I

| Batch | | Analyses (%) | | | | | |
|---|---|---|---|---|---|---|---|
| | | K$_2$O | Na$_2$O | FePO$_4$ | AlPO$_4$ | MgO | SO$_3$ |
| 1 | Pure acid | 0.04 | 0.08 | 0.07 | 0.08 | 0.17 | 0.04 |
| 2 | K$_2$O added | 0.18 | 0.08 | 0.08 | 0.10 | 0.19 | 0.05 |
| 3 | Fe and Al added | 0.04 | 0.10 | 0.19 | 0.26 | 0.15 | 0.05 |
| 4 | K$_2$O, Fe and Al added | 0.19 | 0.08 | 0.18 | 0.26 | 0.15 | 0.05 |
| 5 | K$_2$O, Fe, Al, and SO$_3$ | 0.18 | 0.15 | 0.19 | 0.26 | 0.17 | 0.24 |

Table II shows the original secondary reaction rate of each batch and the secondary reaction after 1, 3 and 10 days' storage at 39° C. and 65% humidity.

Table II

| Batch | Initial | After 1 day | After 3 days | After 10 days |
|---|---|---|---|---|
| | c. c. | c. c. | c. c. | c. c. |
| 1 | 102 | 76 | 60 | 56 |
| 2 | 121 | 111 | 100 | 88 |
| 3 | 123 | 104 | 88 | ---- |
| 4 | 124 | 112 | 97 | 87 |
| 5 | 123 | 114 | 104 | 91 |

In other examples commercially pure phosphoric acid was employed, to which only sodium and potassium were added in accordance with the following table:

Table III

| Percent K$_2$O in product | Primary rate | Original secondary rate | Secondary rate, after 3 days |
|---|---|---|---|
| | c. c. | c. c. | c. c. |
| 0.2 | 28 | 107 | 81 |
| 0.4 | 16 | 118 | 115 |
| 0.9 | 12 | 118 | 14 |
| Percent Na$_2$O | | | |
| 0.12 | 28 | 110 | 110 |
| 0.18 | 18 | 117 | 66 |

The product was stored for the three days in a humidor at 39° C. and 65% relative humidity.

The product containing 0.9% of K$_2$O was, however, not as stable as those containing smaller amounts. It is preferred to employ only 0.1 to 0.5% of alkali metal impurities, although amounts up to 1% are quite practicable. For example, anhydrous monocalcium phosphate was prepared with blast furnace acid to which 0.75% K$_2$O had been added. 2,000 lbs. of the above acid at 57° Baumé gravity strength was heated at 110° C. and 350 lbs. of finely ground quicklime quickly added to the batch mixture. The temperature of the mixture rose quickly to 160° C., and further additions of lime were made at such rate that the temperature remained within the range of 160° C. to 173° C. until the mixture was definitely neutral to methyl orange indicator. The product was then heat-treated at a temperature of 190° C. to 230° C. The product showed a pyrophosphate content of between 3% and 4% and a secondary reaction rate of 120 to 129 c. c. After four days' storage in a humidor at 39° C. 65% relative humidity, the secondary reaction rate was 93 c. c. and after nine days was 74 c. c.

A typical lime employed had the following composition:

Table IV

| | Per cent |
|---|---|
| CaO | 98. |
| MgO | .3 |
| Insoluble | |
| Mostly silica | .45 |
| Fe$_2$O$_3$ and Al$_2$O$_3$ | .2 |
| SO$_3$ | .03 |
| Loss on ignition | 0.9 |
| K$_2$O | 0.007 |
| Na$_2$O | 0.028 |

(Balance undetermined)

Blast furnace acid as here discussed is acid which has been produced in the customary manner, the production including the removal of undesirable or toxic impurities such as lead, arsenic and fluorine. A typical approximate composition for 56° Baumé acid is as follows:

Table V

| | Per cent |
|---|---|
| $P_2O_5$ | 56.6 |
| $H_3PO_4$ | 76.8 |
| $FePO_4$ | 0.1–0.2 |
| $AlPO_4$ | 0.2–0.3 |
| $CaO$ | .02–.03 |
| $MgO$ | .02–.03 |
| $K_2O$ | 0.20–.40 |
| $Na_2O$ | 0.1–0.2 |
| $SiO_2$ | .01 |
| $SO_3$ | 0.2–0.3 |
| Mn, As, F, Ni, etc. | less than 0.05 |

For the preferred product it is desirable that the product should contain at least 0.1% of an alkali metal, particularly potassium. It should not contain after heat-treatment more than 5% of material classified as "pyrophosphate" and should after heat-treatment have less than 3% of such material. It should have the property of reacting with sodium bicarbonate in water solution or wet dough mixtures at such rate that less than 25% of the reaction is completed in the first two minutes (primary reaction rate), while at least 35% of the total gas evolution takes place within the succeeding two to ten or two to fifteen minute period (secondary reaction rate). The stability of the product should be such that after 20 days storage at 39° C. in an atmosphere of 65% relative humidity, the secondary reaction rate is still at least 60 c. c., or 30% of the total theoretical gas. The product should be substantially less than 100 mesh particle size and preferably less than 200 mesh, and should not contain any free acid, and should have a neutralizing value below 95 and generally over 80, preferably from 83 to 88. A product carefully made from blast furnace acid, or one having the impurities characteristic thereof in this respect, reacted with lime under the preferred conditions outlined, and then heat-treated as here indicated, will have a primary reaction rate of less than 20% and a secondary reaction rate of at least 50%, and the latter will remain as high as 35% or more after 20 days storage at 39° C. and at 65% relative humidity.

The stability of the heat-treated product against hydration in a moist atmosphere was tested by placing a sample in a humidor at 90° F. in an atmosphere of 60% relative humidity, and determining the gain in weight after definite periods of time. Complete hydration is when the product has absorbed sufficient water to form the monohydrated salt. The following table illustrates typical comparative hydration characteristics of pure crystalline anhydrous monocalcium phosphate (Pure A. M. C. P.); and the heat-treated product of the present application (Heat-treated A. M. C. P.).

Table VI

| Number of days | Percentage of theoretical hydration | |
|---|---|---|
| | Pure A. M. C. P. | Heat-treated A. M. C. P. |
| 1 | | 0.5 |
| 2 | 100.00 | 1.0 |
| 4 | | 1.8 |
| 6 | | 2.5 |

As hereinafter stated, however, it is possible also to improve the secondary reaction rates of anhydrous monocalcium phosphates, which are much less adapted to heat-treatment than the preferred base materials. For example, Table VII gives an analysis of three hydrated monocalcium phosphates which were heat-treated according to the present invention by first dehydrating and then heat-treating.

The product A showed a secondary dough reaction rate of 73 c. c. after heat-treatment, as compared with an original secondary rate of 6 c. c. before dehydration.

The product B showed a secondary rate of 24 c. c. after heat-treatment as compared to an original one of 13.

Product C increased its secondary reaction rate from 15 to 30 c. c. on heat-treatment.

Table VII

| | A | B | C |
|---|---|---|---|
| Neutralizing value | 83.8 | 83.4 | 81.4 |
| Free acid percent | 0 | 0 | 0.4 |
| Acid insoluble do | 0.05 | 0.12 | 0.04 |
| Fe and $AlPO_4$ do | 0.42 | 0.08 | 0.56 |
| $FePO_4$ do | 0.19 | 0.035 | 0.14 |
| Total $P_2O_5$ do | 55.5 | 55.5 | 55.6 |
| W. S. $P_2O_5$ do | 51.55 | 52.2 | 51.5 |
| $SO_3$ do | 0.21 | 0.08 | 0.24 |
| $CaO$ do | 23.18 | 23.0 | 21.8 |
| $MgO$ do | 0.18 | 0.16 | 0.54 |
| Mn do | 0.0039 | 0.0003 | 0.10 |
| Pb p. p. m | 1.3 | 5 | 2 |
| F p. p. m | 4.0 | 12 | 36 |
| $As_2O_3$ p. p. m | 0.5 | 0.2 | 0.3 |
| $H_2O$ (free) percent | 0.38 | 0.08 | 0.35 |
| Loss on ignition do | | 21.0 | 21.0 |
| $K_2O$ do | 0.22 | 0.037 | 0.16 |
| $Na_2O$ do | 0.50 | 0.038 | 1.33 |

A small amount of free acid may be formed on the surface of the less alkaline material during the heat treatment, which renders the particles slightly sticky. To overcome this it is preferred to add a small amount of a neutralizing agent in powdered form, for example, by adding precipitated chalk, hydrated lime, tricalcium phosphate or magnesium carbonate. Usually from ½ to 2% of this conditioning agent is sufficient to render the product entirely free-flowing and also contributes to its stability against hydration during storage in humid climates.

When heating the porous anhydrous monocalcium phosphate, the skin apparently forms not only on the outer surface of the particle but appears to follow the pores of the material.

It appears, however, that with this material prepared by heating hydrated monocalcium phosphate at a temperature and period of time sufficient to produce a skin coating an appreciable amount of the orthophosphate is converted to a more molecularly dehydrated form.

For example, regular hydrated monocalcium phosphate of 200 mesh size was heated over 1¼ hours to 230° C. At the end of this time about 7% of the material had been converted to pyrophosphate, and the particles had a skin coating which slowed down the reaction rate to the extent of 27% in the first two minutes as compared to 67% for the initial material. The material also showed 34% of reaction in the succeeding 13-minute interval.

The slower reaction rates of the heat-treated materials in the above examples are extremely advantageous in the baking of cakes, biscuits, etc. For example, the slow evolution of $CO_2$ gas during the first two minutes of the dough mixing stage permits a thorough mixing of the dough or batter without an excessive loss of leavening gas during this period. In other words, a high percentage of the leavening capacity of the baking powder is reserved for the baking stage. Greater specific volume of the baked product is obtained. For example, in the case of biscuits the relative specific volumes obtained when using the heat-treated material are as follows: using ordinary hydrated monocalcium phosphate as the basis of comparison, the product obtained from heating the solid anhydrous monocalcium phosphate had a specific volume about 25 to 35% greater, and the product described in the preceding paragraph had a specific volume about 20% greater.

Another important advantage in the use of heat-treated products is the fact that the baked products do not have the characteristic slightly bitter, astringent taste normally associated with the use of pyrophosphate baking acids such as sodium acid pyrophosphate. It is permissible in the heat-treatment to form a small amount of pyrophosphate. Such pyrophosphate would, of course, contribute its proportion of "pyro flavor", but this flavor is not noticeable in the baked product until the pyrophosphate content of the baking acid is present in an amount greater than one-fourth of the total baking acid. In this process the heating can be easily controlled to prevent the formation of more than 10% of a molecularly dehydrated phosphate even in the case of the hydrated monocalcium phosphate and still obtain a satisfactory skin coating of the particles. In the case of the specially prepared solid non-porous crystalline material I find in no case is it necessary to heat sufficiently long to convert more than 5% of the orthophosphate to a more highly dehydrated form.

Microscopic observations show that when the heat-treated crystals are placed in water that solution is very slow and that solution begins wherever there is a break in the skin coating, the interior of the particles dissolving first, leaving a thin transparent shell of relatively insoluble material. The relative imperviousness of the outer shell or skin coating appears to control the rate of solution of the core of anhydrous monocalcium phosphate.

The relative stability and slow reaction rate of the new heat-treated anhydrous monocalcium phosphate permits for the first time the use of small particle size calcium acid phosphate in commercial baking powders. Heretofore the commercial phosphate baking powders have been composed of granular materials, the greater portion of which was larger than 200 mesh size and smaller than 140 mesh in size.

The new product may be used in particle sizes smaller than 140 mesh or even less than 200 mesh in admixture with sodium bicarbonate to give a commercial baking powder of good keeping quality during storage. The prior difficulty was to choose a gradation of particle sizes of monocalcium phosphate monohydrate for baking powders which are not so large that black specks result on the surface crust of the baked product and not so small as to cause premature liberation of the leavening gas during the storage of the baking powder. As a result, the commercial acid phosphate baking powders have been made from a granular calcium acid phosphate ranging from about 120 mesh to not less than 200 mesh size particles. The present product on the other hand is preferably used in particle sizes substantially most of which are smaller than 200 mesh.

The slow reaction rate and stability against hydration of this product makes its use highly advantageous in self-rising flours. The new product is especially applicable to cake and waffle ready-made flour mixtures, in that such mixtures can be made to include higher ratios of sugar and flavoring ingredients, thus permitting the making of more tasty baked products. Normally the ready-mixed cake and waffle flours on the market contain sodium acid pyro-phosphate because of its slow reaction rate, but the baked products are not entirely satisfactory. The characteristic "pyro flavor" is present, and, when the acid is used at its correct neutralizing value the pyrophosphate end products give the baked product an alkalinity of the order of a pH value of 7.8. This degree of alkalinity has a detrimental effect on the flavoring ingredients. On the other hand, if the sodium acid pyrophosphate is used at such neutralizing value as to insure a lower pH value of around 7.0 the intensity of the "pyro flavor" is increased. When substituting the present heat treated product for the sodium acid pyrophosphate in the prepared cake and waffle flours, it can be used at its correct neutralizing value, giving a baking product with a pH value of the order of 7.0 to 7.1 without any "pyro flavor". The lower alkalinity will permit a better development and retention of the desirable flavors without the use of excess amounts of flavoring ingredients to offset a "pyro flavor". Thus a more desirable ready mixed cake, biscuit, or waffle flour can be placed on the market. The prepared self-rising flour mixes may include the proper amounts of sugar, shortening, salt and other flavoring agents to give the desired type of baked product.

The efficiency of the heat-treated baking acid in the baking stage is so great that the amounts of leavening ingredients may be materially reduced while still obtaining a superior baked product from the standpoint of volume, texture and flavor. This is true, either in the case of self-rising flours or home or bakery mixed doughs. For example, biscuits baked with two-thirds of the amount of soda and baking acid normally required when hydrated monocalcium phosphate is the baking acid still have a greater specific volume and superior texture.

For example, Table VIII shows the specific volumes of biscuits when prepared from dough made with ordinary monocalcium phosphate (M. C. P.) as compared with those from the present heat-treated anhydrous monocalcium phosphate (A. M. C. P.):

*Table VIII*

| Dough standing time. After mixing and before baking | Specific volume of biscuits | | Height of six biscuits | |
|---|---|---|---|---|
| | Ordinary M. C. P. | Heat-treated A. M. C. P. | Ordinary M. C. P. | Heat-treated A. M. C. P. |
| | | | Inches | Inches |
| 0 minutes | 2.85 | 3.07 | 7⅛ | 9½ |
| 2.5 minutes | 2.80 | 3.08 | 7 | 9½ |
| 5.0 minutes | 2.52 | 2.98 | 6¼ | 8 |
| 7.5 minutes | 2.50 | 2.63 | 7 | 7¼ |
| 10.0 minutes | 2.38 | 2.38 | 6⅞ | 6⅔ |

Since one-third more volume is obtainable in biscuits where the dough is not permitted to stand for excessive periods, it is possible to use at least one-fourth less of the leavening constituents to produce biscuits of normal size.

In self-rising flours it is customary to employ 1½% baking soda (based on the flour) together with the equivalent amount of baking acid. With the present material this may be decreased to 1.0% and still produce biscuits of superior volume as compared to the former mixes containing ordinary monocalcium phosphate.

For example, in a self-rising flour containing 1.0 part sodium bicarbonate, 1.75 parts salt, 1.18 parts heat-treated anhydrous monocalcium phosphate and 100 parts flour gave a superior volume when baked as compared to biscuits made from a flour containing 1.5 parts sodium bicarbonate, 1.875 parts ordinary hydrated monocalcium phosphate, 1.75 parts salt and 100 parts flour, mixing and baking conditions being identical.

The character of the baked article is quite different from that of ordinary biscuits, both with self-rising flour and freshly mixed doughs. The texture resembles closely that of yeast made bread, the cells are thin-walled and large, the crumb has a flaky appearance and tender feel, and the side walls are smooth. This improvement is apparently due to the slowly soluble nature of the new heat-treated baking acid, which permits the soda to dissolve first and thus cause a preliminary development of a suitable gluten condition in an alkaline medium before the neutral condition develops.

Where pyrophosphate contents are given they were determined by dissolving a sample of the product in dilute hydrochloric acid, neutralizing with N/10 caustic soda to a brom phenol blue end point, then adding an excess of zinc sulfate to precipitate the pyrophosphate as a zinc salt and titrating the liberated sulfuric acid with N/10 NaOH to a brom phenol blue end point and calculating the result as calcium acid pyrophosphate.

The term "non-porous" as used in this specification and in the claims is intended to mean a solid particle not built up from an agglomeration of minute crystals with intervening fissures and spaces between the component parts of the whole particle nor a particle resulting from the driving out of water by heat from a crystal which contained water of crystallization.

The term "autogenous coating" as used in the claims hereof means that the coating is formed from an ingredient or ingredients of the crystal itself by a process including heat. The coating may of course include ingredients which are not natural to the crystal The terms 100 mesh and 200 mesh sizes are used in this specification and claims to mean particles which have been passed through standard 100 mesh and 200 mesh sieves having openings of 0.0058" and 0.0029", respectively.

This application is a continuation in part of my copending application Serial No. 149,025, filed June 18, 1937.

The foregoing detailed description has been given for clearness of understanding only, and no unnecessary limitations should be understood therefrom, but the appended claims should be construed as broadly as permissible, in view of the prior art.

I claim:

1. As an article of manufacture, particles of finely divided anhydrous monocalcium phosphate having a thin, autogenous, glassy, substantially complete, relatively insoluble coating, the particles of said monocalcium phosphate being substantially free from pyrophosphate.

2. As an article of manufacture, particles of finely divided anhydrous monocalcium phosphate having a thin, autogenous, vitreous, substantially complete, relatively insoluble coating, the particles of said monocalcium phosphate containing less than 10% of pyrophosphate.

3. Anhydrous monocalcium phosphate as set forth in claim 23 in which the material has a primary reaction rate with sodium bicarbonate of not more than 25% and a secondary reaction rate therewith of not less than 25%.

4. Anhydrous monocalcium phosphate as set forth in claim 23 in which the particles contain from .1% to 1.0% of alkali metal calculated as oxide.

5. Anhydrous monocalcium phosphate as set forth in claim 23 in which the particles contain less than 3% of pyrophosphate.

6. As an article of commerce, particles of finely divided non-porous anhydrous monocalcium phosphate substantially pyrophosphate-free having a thin, autogenous, glassy, relatively insoluble coating.

7. As an article of commerce, particles of finely divided non-porous anhydrous monocalcium phosphate substantially pyrophosphate-free having a thin, autogenous, glassy, substantially complete, relatively insoluble coating.

8. Anhydrous monocalcium phosphate as set forth in claim 7 in which the material has a neutralizing value between 80 and 88.

9. Anhydrous monocalcium phosphate as set forth in claim 7 in which the particles of anhydrous monocalcium phosphate contain impurities characteristic of blast furnace phosphoric acid.

10. A product as set forth in claim 7 in which the anhydrous monocalcium phosphate has been prepared in solid crystalline form by mixing blast furnace phosphoric acid and lime at a reaction temperature substantially in the range of 160 C. to 175° C. and maintained within that range until completion of the reaction.

11. As an article of commerce, particles of finely divided non-porous anhydrous monocalcium phosphate having a thin, autogenous, glassy, vitreous, substantially complete, relatively insoluble coating, the particles containing less than 3% of pyrophosphate.

12. As an article of commerce, particles of finely divided crystalline non-porous anhydrous monocalcium phosphate having a thin, autogenous, glassy, substantially complete, relatively insoluble coating, said particles containing less than 10% of pyrophosphate and having a reaction rate with sodium bicarbonate of not more than 25% and a secondary reaction rate of at least 35%.

13. As an article of commerce, particles of crystalline non-porous anhydrous monocalcium phosphate having a thin, autogenous, glassy, vitreous, substantially complete, relatively insoluble coating, said particles containing less than 10% of pyrophosphate and having a primary reaction rate with sodium bicarbonate of not more than 20% and a secondary rate therewith of at least 50%, said product having a stability against hydration such that after 20 days' storage at 39° C. in an atmosphere of 65% relative humidity the secondary rate is still at least 35%.

14. As an article of commerce, particles of finely divided non-porous anhydrous monocalcium phosphate substantially pyrophosphate-free having a thin, autogenous, vitreous, substantially complete, relatively insoluble coating, said anhydrous monocalcium phosphate particles containing from .1% to 1.0% of alkali metal calculated as oxide.

15. A product as set forth in claim 14 in which the alkali metal is in large part potassium.

16. As an article of commerce, particles of finely divided anhydrous non-porous monocalcium phosphate having a thin, autogenous, vitreous, substantially complete, relatively insoluble coating, said particles containing less than 3% of pyrophosphate, having a neutralizing value of 83 to 88, having a primary reaction rate with sodium bicarbonate of less than 25% and a secondary rate of at least approximately 50%, the particles containing from .1% to 1.0% of alkali metal calculated as oxide, and having a stability such that after 20 days' storage at 39° C. in an atmosphere of 65% relative humidity the secondary rate is still at least 35%.

17. Anhydrous monocalcium phosphate having an integral vitreous, relatively insoluble skin coating thereon, containing less than 5% pyrophosphate, containing at least 0.1% alkali metal calculated as oxide, having a primary reaction rate with sodium bicarbonate of not more than 25% and a secondary reaction rate of not less than 35%, and sufficiently stable against hydration that at 90° F. in an atmosphere of 60% relative humidity it will not become more than 5% hydrated in 5 days.

18. The method of producing a thin, vitreous, substantially complete, relatively insoluble coating upon finely divided particles of anhydrous monocalcium phosphate, which comprises heating anhydrous monocalcium phosphate for a prolonged period at a temperature above 140° C. and below a temperature at which substantial conversion to molecularly dehydrated phosphate occurs, to produce such thin, vitreous, substantially complete, relatively insoluble coating without producing more than 5% of pyrophosphate by such treatment, whereby the primary reaction rate of the anhydrous material with sodium bicarbonate is decreased to below 35%, and the secondary reaction rate therewith is increased to at least 25%.

19. The method as set forth in claim 18 in which the material is heated to a temperature of 180° C., the temperature is then raised gradually to 200° C. and is then maintained within the range of 200° C. to 220° C. for a period of approximately one-half hour.

JULIAN R. SCHLAEGER.

CERTIFICATE OF CORRECTION.

Patent No. 2,160,232. May 30, 1939.

JULIAN R. SCHLAEGER.

It is hereby certified that error appears in the printed specification of the above numbered patent requiring correction as follows: Page 5, first column, line 49, for "himidity" read humidity; line 74, for the word "hereinafter" read hereinbefore; page 7, first column, line 48, after "crystal" insert a period; and second column, lines 2, 7, and 11, claims 3, 4, and 5 respectively, for the claim reference numeral "23" read 2; line 35, claim 10, for "160 C." read 160° C.; and that the said Letters Patent should be read with this correction therein that the same may conform to the record of the case in the Patent Office.

Signed and sealed this 15th day of August, A. D. 1939.

Leslie Frazer (Seal) Acting Commissioner of Patents.

finely divided anhydrous non-porous monocalcium phosphate having a thin, autogenous, vitreous, substantially complete, relatively insoluble coating, said particles containing less than 3% of pyrophosphate, having a neutralizing value of 83 to 88, having a primary reaction rate with sodium bicarbonate of less than 25% and a secondary rate of at least approximately 50%, the particles containing from .1% to 1.0% of alkali metal calculated as oxide, and having a stability such that after 20 days' storage at 39° C. in an atmosphere of 65% relative humidity the secondary rate is still at least 35%.

17. Anhydrous monocalcium phosphate having an integral vitreous, relatively insoluble skin coating thereon, containing less than 5% pyrophosphate, containing at least 0.1% alkali metal calculated as oxide, having a primary reaction rate with sodium bicarbonate of not more than 25% and a secondary reaction rate of not less than 35%, and sufficiently stable against hydration that at 90° F. in an atmosphere of 60% relative humidity it will not become more than 5% hydrated in 5 days.

18. The method of producing a thin, vitreous, substantially complete, relatively insoluble coating upon finely divided particles of anhydrous monocalcium phosphate, which comprises heating anhydrous monocalcium phosphate for a prolonged period at a temperature above 140° C. and below a temperature at which substantial conversion to molecularly dehydrated phosphate occurs, to produce such thin, vitreous, substantially complete, relatively insoluble coating without producing more than 5% of pyrophosphate by such treatment, whereby the primary reaction rate of the anhydrous material with sodium bicarbonate is decreased to below 35%, and the secondary reaction rate therewith is increased to at least 25%.

19. The method as set forth in claim 18 in which the material is heated to a temperature of 180° C., the temperature is then raised gradually to 200° C. and is then maintained within the range of 200° C. to 220° C. for a period of approximately one-half hour.

JULIAN R. SCHLAEGER.

---

CERTIFICATE OF CORRECTION.

Patent No. 2,160,232.     May 30, 1939.

JULIAN R. SCHLAEGER.

It is hereby certified that error appears in the printed specification of the above numbered patent requiring correction as follows: Page 5, first column, line 49, for "himidity" read humidity; line 74, for the word "hereinafter" read hereinbefore; page 7, first column, line 48, after "crystal" insert a period; and second column, lines 2, 7, and 11, claims 3, 4, and 5 respectively, for the claim reference numeral "23" read 2; line 35, claim 10, for "160 C." read 160° C.; and that the said Letters Patent should be read with this correction therein that the same may conform to the record of the case in the Patent Office.

Signed and sealed this 15th day of August, A. D. 1939.

Leslie Frazer (Seal)     Acting Commissioner of Patents.